March 11, 1924.
A. J. CHESSON
1,486,728
TOBACCO TRUCK
Filed Sept. 13, 1920
2 Sheets-Sheet 1
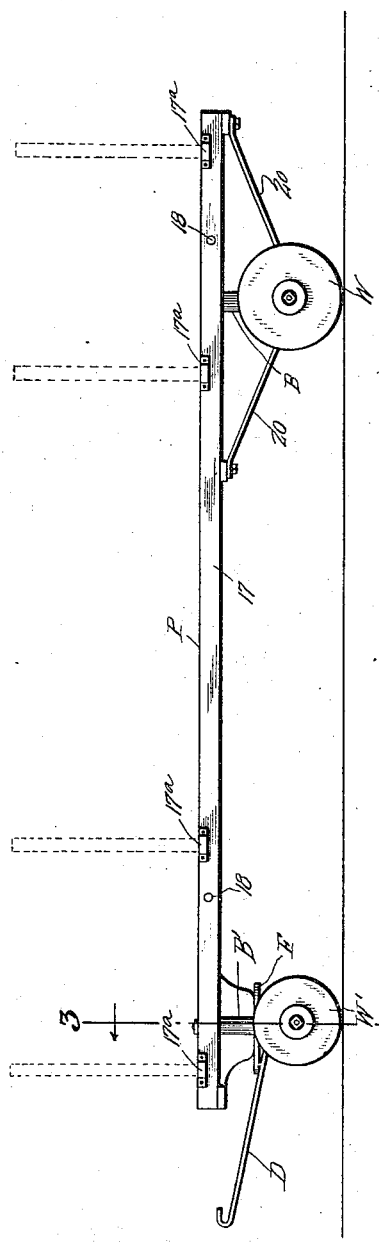
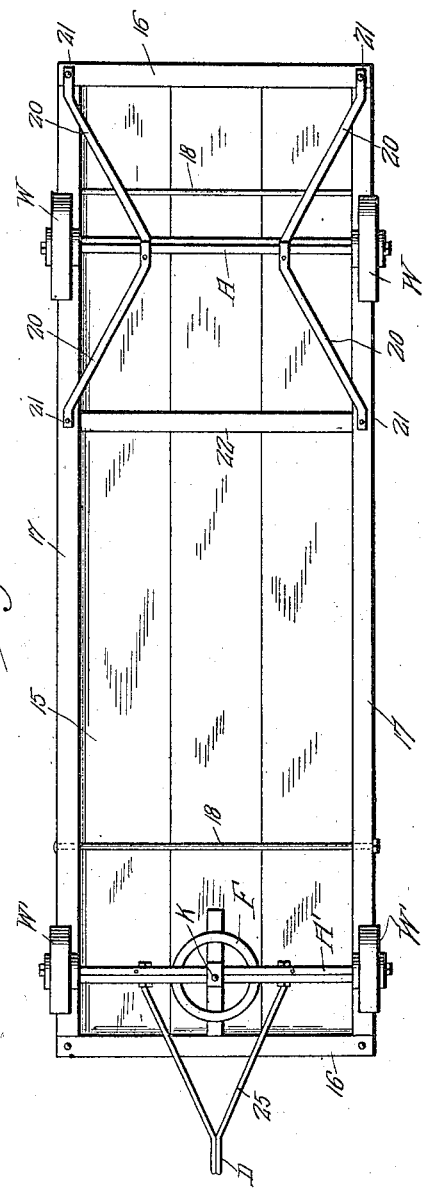
WITNESSES
INVENTOR
A.J. Chesson,
BY
ATTORNEYS

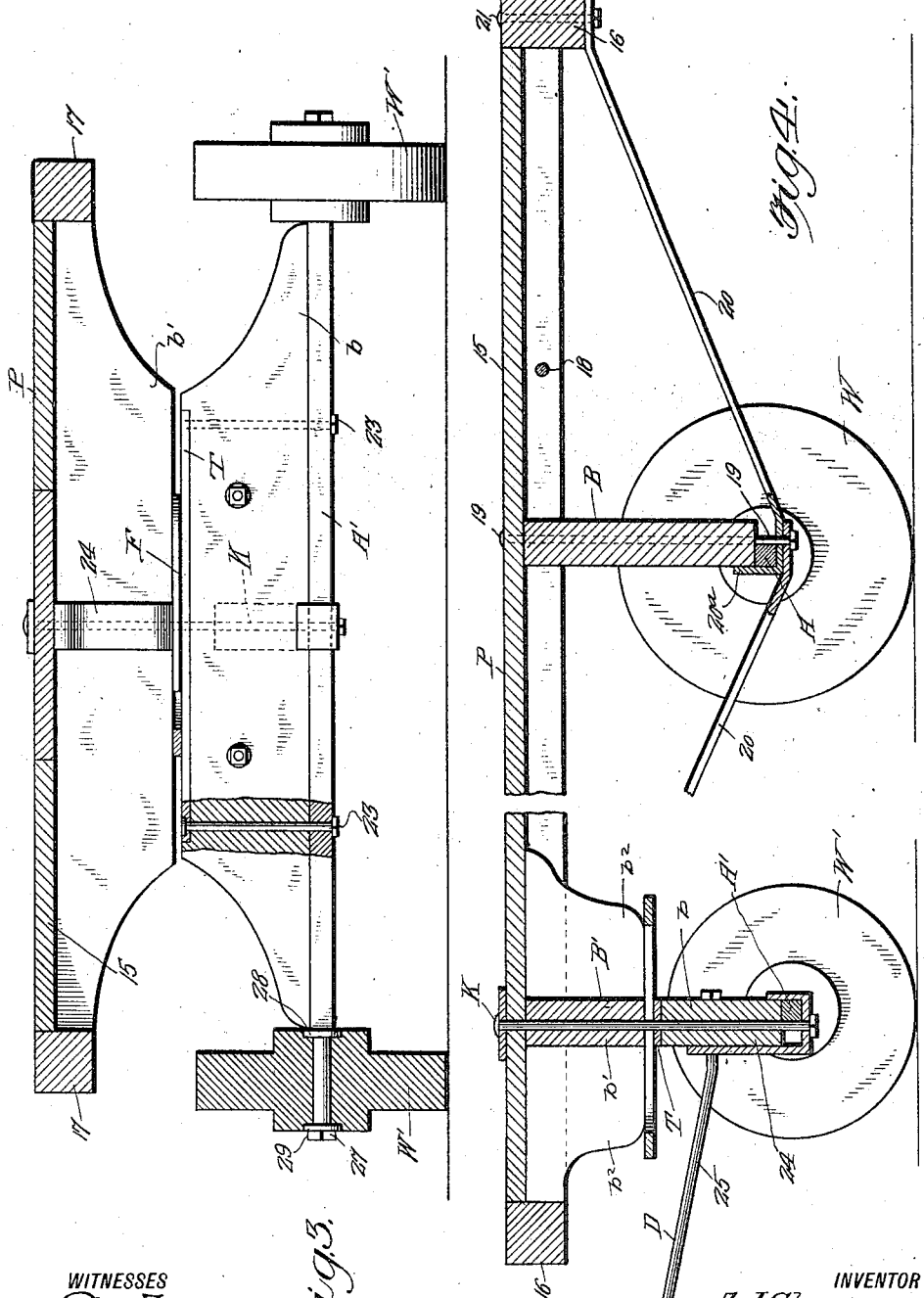

Patented Mar. 11, 1924.

1,486,728

UNITED STATES PATENT OFFICE.

ANDREW JACKSON CHESSON, OF KINSTON, NORTH CAROLINA.

TOBACCO TRUCK.

Application filed September 13, 1920. Serial No. 410,002.

*To all whom it may concern:*

Be it known that I, ANDREW JACKSON CHESSON, a citizen of the United States, and a resident of Kinston, in the county of Lenoir and State of North Carolina, have invented certain new and useful Improvements in Tobacco Trucks, of which the following is a specification.

My invention relates generally to trucks and particularly to trucks adapted to the hauling of tobacco.

A purpose of my invention is the provision of a new and improved tobacco truck which is simple and inexpensive in construction, extremely durable, and highly efficient for the purpose intended.

I will describe one form of truck embodying my invention and will then point out the novel features thereof in claims.

In the accompanying drawings:

Figure 1 is a view showing in side elevation one form of truck embodying my invention.

Figure 2 is a bottom plan view of the truck shown in Figure 1.

Figure 3 is an enlarged transverse sectional view taken substantially on the line 3—3 of Figure 1 with certain parts shown in elevation.

Figure 4 is a central longitudinal sectional view of the truck shown in the preceding views.

Similar reference characters refer to similar parts in each of the several views.

Referring specifically to the drawings, P designates the platform of the truck which comprises a plurality of longitudinally extending boards 15 arranged edge to edge and connected at their ends by end beams 16. Extending along the outer side edges of the outer-most boards are side beams 17. The side and end beams 17 and 16 are of rectangular formation in cross section and as indicated in Figures 3 and 4 are so disposed with relation to the boards 15 as to have portions thereof depending from the under side of the boards.

For reinforcing the platform so as to maintain its original form under the most adverse conditions, the side beams are rigidly connected at points adjacent their ends by brace rods 18 which are in the present instance in the form of bolts. As shown in Figures 2 and 4 these brace rods 18 extend through that portion of the side beams disposed below the boards 15.

The platform P is supported at its rear end by a pair of rear wheels W, the latter in turn being journaled on the opposite ends of an axle A. The axle A is rigidly supported upon the platform P by a bolster B depending from the boards 15 and secured thereto by bolts 19. As illustrated to advantage in Figure 4, the lower ends of the bolts 19 protrude beyond the lower edge of the bolster B, these projecting ends providing securing means for the confronting ends of two pairs of brace bars 20. As shown in Figure 2, each pair of brace bars 20 are arranged in divergent relation with respect to each other with their outer ends secured by means of bolts 21 to the rear end beam 16 and a transverse beam 22. The rear brace bar of each pair is extended at its forward end in the form of an L as indicated at 20$^a$ in Figure 4 so as to coact with the adjacent bolt 19 for securely gripping the axle A therebetween. As two such extensions 20$^a$ are provided, it will be obvious that a positive supporting of the axle is secured to maintain the same in proper position with respect to the platform P.

The brace bars 20 in addition to supporting the axle upon the bolster also serve to brace the bolster against lateral movement so that the platform is rigidly supported upon the axle.

The platform P is supported at its forward end by a pair of front wheels W', such wheels being journaled upon the opposite ends of an axle A'. The axle A' is rigidly secured to the rotatable section $b$ of a front bolster B' so that steering of the wheels W' can be readily effected. As shown in Figures 3 and 4, the bolster B' comprises an upper stationary section $b'$ in addition to the lower rotatable section $b$. The upper section $b'$ is snugly fitted between the side beams 17 and is secured to the boards 15 by a king bolt K. The section $b'$ is braced upon its opposite sides by blocks $b^2$ of the form shown in Figure 4. The rotatable section $b$ is of the form shown in Figure 3 and is rotatably mounted upon the upper section by the king bolt K. Interposed between the two sections and secured to the upper section is a fifth wheel F against which bears a bearing plate T secured to the upper edge of the rotatable section by bolts 23. By this arrangement, it will be seen that the section $b$ is free to rotate upon the stationary section $b'$ with the king bolt K as a center, and that during rotation of the lower section the plate T bears against the fifth wheel F.

As shown in Figures 3 and 4, the axle A' is rigidly secured to the lower edge of the rotatable section $b$ by the bolts 23 and by an L-shaped bar 24 that is arranged upon the rotatable section in a manner similar to the extension 20$^a$ so as to coact with the king bolt K in securely retaining the axle upon the bolster.

As illustrated to advantage in Figure 3, each wheel W or W' is journaled on the spindle of the axle A or A' and is secured thereon against displacement by a nut 27. The wheel is locked against inward movement on the spindle by a flange 28 which occupies a counter-sunk position with respect to the hub of the wheel so as to prevent the passage of dust or other foreign matter into and between the spindle and wheel. A washer 29 is confined upon the spindle by the nut 27 and is counter-sunk with respect to the wheel in a manner similar to the flange 24 and for the same purpose.

As shown in Figures 1, 2 and 4, the forward bolster B' is provided with a draft tongue D which comprises a pair of rods 25 arranged in divergent relation with respect to each other, with their rear ends extending through and secured to the rotatable section $b$. The forward or meeting ends of the rods 25 are bent upwardly and rearwardly to provide a hook 26 to which a draft appliance may be attached in moving the truck from place to place.

As shown in Figure 1, the side beams 17 may be provided at intervals with stake supporting brackets 17$^a$, the stakes being supported in the positions as shown in dash lines.

From the foregoing description, when taken in conjunction with the accompanying drawings, it will be manifest that I have provided a tobacco truck of extremely simple and inexpensive construction, and that the platform, bolsters, and axles are so braced and secured to each other as to produce a truck which is extremely strong and durable so as to withstand the rough usage to which it is usually subjected.

Although I have herein shown and described only one form of truck embodying my invention, it is to be understood that various changes and modifications may be made herein without departing from the spirit of the invention or the spirit and scope of the appended claims.

What I claim is:—

1. In a truck, a front bolster comprising a stationary section and a movable section, blocks for bracing the stationary section, a fifth wheel secured to the stationary section, a king bolt extending through said stationary section for rotatably supporting the movable section on the stationary section, said king bolt projecting beyond the lower edge of the movable section, an axle arranged at the lower edge of the movable section, wheels journaled on said axle, and an L-shaped bar carried by the king bolt and confining the axle in one of its lower corners between the king bolt projecting therethrough and the upstanding end of the L-shaped bar.

2. In a truck, a front bolster comprising a stationary section and a movable section, a king bolt extending through the stationary section and rotatably supporting the movable section on the stationary section, a fifth wheel interposed between said sections, an axle arranged upon the lower edge of the movable section, a countersunk plate carried by the upper edge of the movable section and contacting with the fifth wheel, bolts extending through the movable section for securing said plate and said axle to the movable section, the lower end of the king bolt projecting beyond the lower edge of the movable section, an L-shaped bar secured to the projecting end of the king bolt and embracing the movable section and the axle.

3. In a truck, a platform, a front bolster comprising a stationary section and a movable section rotatable on the stationary section, an axle carried by the movable section, and wheels journaled on said axle, each of said axles having flanges formed thereon adjacent the spindle portion thereof, and each of said wheels being countersunk to receive said flanges, for the purpose described.

4. In a truck, a platform, a rear bolster depending from the platform, bolts for securing the bolster to the platform extending through and below the lower edge of said bolster, brace rods secured at one end to the platform and at the other to said bolts, with the last mentioned ends arranged in overlapped relation and having certain ends formed with upwardly bent extensions, and an axle arranged at the lower edge of the bolster between the projecting ends of said bolts and said extensions whereby the latter serve to retain the axle upon the bolster.

ANDREW JACKSON CHESSON.